June 7, 1949.  H. NAGEL  2,472,307
COUPLING DEVICE FOR DETACHABLY SECURING SUNSHADES,
FILTER HOLDERS, AND LIKE ACCESSORIES
TO THE LENS BARRELS OF CAMERAS
Filed Jan. 23, 1946
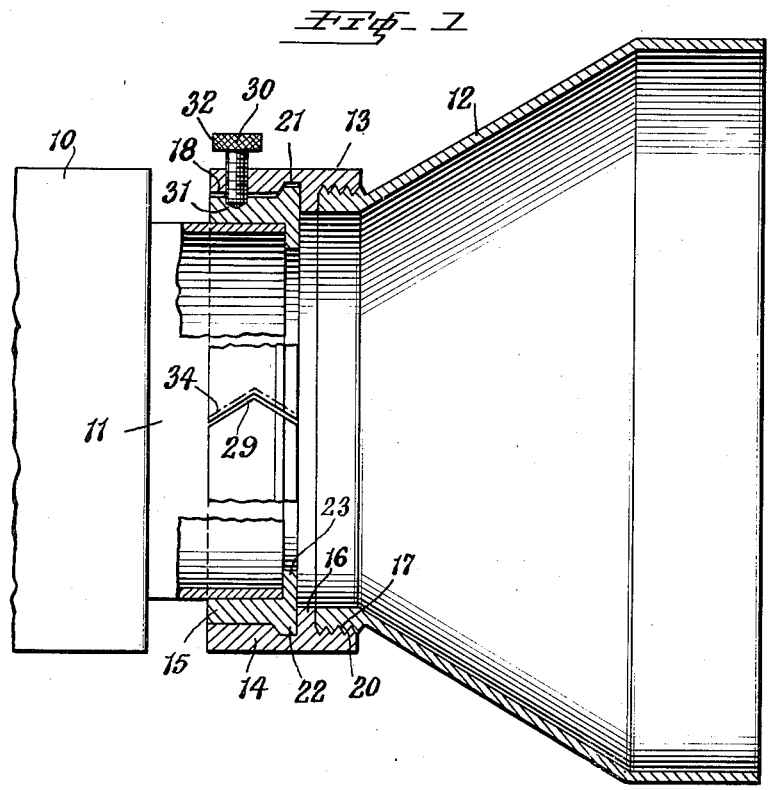
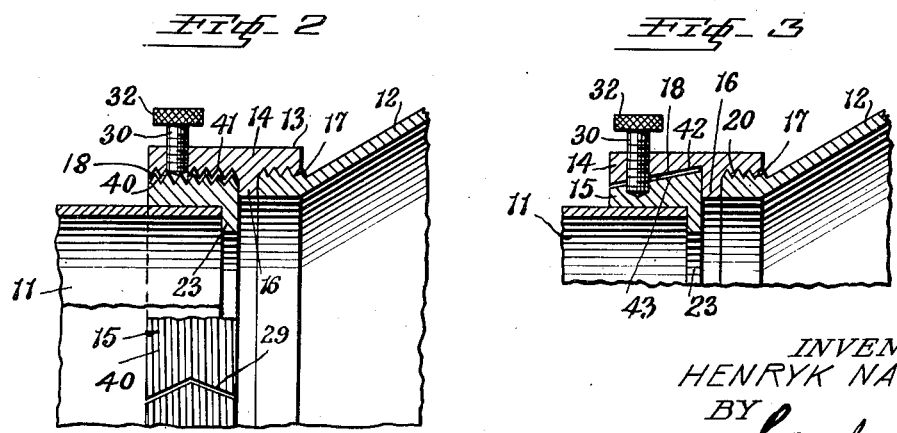
INVENTOR
HENRYK NAGEL Patented June 7, 1949

2,472,307

UNITED STATES PATENT OFFICE 2,472,307

COUPLING DEVICE FOR DETACHABLY SECURING SUNSHADES, FILTER HOLDERS, AND LIKE ACCESSORIES TO THE LENS BARRELS OF CAMERAS

Henryk Nagel, Bronx, N. Y.

Application January 23, 1946, Serial No. 642,792

4 Claims. (Cl. 88—1)

This invention relates generally to coupling devices employed for removably securing such accessory parts as lens shades, light filter mounts, and like light regulating implements to photographic cameras.

It is an object of the present invention to provide means simple in construction and manipulation for readily and securely attaching light regulating implements to a carrier, such as the lens barrel of a camera, and for removal therefrom; said means tending to constrict certain portions of the coupling device around the lens barrel over which it is fitted, whereby it will firmly frictionally grip the barrel and hold its position thereon.

Another object of the invention is to provide means affording the frictional securement of a split coupling ring around a lens barrel without requiring relative rotary movement of the interengaging parts of the device so that the location and securement of the device upon the lens barrel and its ready removal therefrom, when desired, will be materially simplified.

Still another object of the invention is to provide means readily accessible for effecting a coupling action of a split ring around the lens barrel for securing the device in place thereon, such means including a radially-extending pressure element, such as a set screw, that is manually operative to effect a constricting action of the ring with respect to the lens barrel.

A still further object of this invention is the provision of means ensuring a lever-like actuation of the coupling ring device with respect to the carrier or lens barrel to which it is to be attached in frictional and clamping relation.

These and other objects of the invention are obtained, a more particular description of which appearing hereinafter and being set forth in the claims appended hereto.

In the accompanying drawing:

Fig. 1 is a side elevation of the coupling device made in accordance with this invention, shown partly in section, and applied to a lens barrel of a camera and carrying a lens shade.

Fig. 2 is a sectional view of parts of the device, shown in a modified construction.

Fig. 3 is a sectional view of parts of the device in a further modified form.

With reference to the structure shown in Fig. 1 of the drawing, numeral 10 indicates the forward portion of a photographic camera terminating into a lens carrier barrel 11 of the conventional character to which a lens shade 12 or other light regulating implement is adapted to be removably attached, as will be hereinafter described.

For the attachment of the lens shade 12, a coupling device 13 is provided which is adapted to engage the shade 12 or any other preferably tubular member and secure the same to the lens barrel. The coupling device includes a holding member 14 and a sleeve member 15. Holding member 14 is tubular in cross section and is provided with an inner annular rim 16, dividing said member 14 into a forward portion 17 and a rearward portion 18. Forward portion 17 is internally threaded to accommodate the threads 20 provided at the end portion of the lens shade. The rearward portion 18 of holding member 14 is provided with an annular groove 21 for the reception of a flange or projecting portion 22 provided at one end of the sleeve or split ring 15, this interengagement of the flange 22 with the groove 21 of the member 14 serving to prevent separation of the sleeve 15 from the member 14 in an axial direction of the device.

The sleeve or split ring 15 is also formed with an inwardly extending annular flange 23 which forms an abutment against the forward end of the lens barrel, as shown in Fig. 1, when the coupling device is fitted in position thereon, thereby properly locating it with respect to the barrel.

The sleeve member or split ring 15 is provided with an inverted V-shaped slot 29 extending transversely across the sleeve. It will be understood that this slot may be straight or may be differently shaped, but it is preferred to employ the inverted V-shape for the purpose of positively guiding the spaced apart slit ends together when the sleeve or ring is constricted in a manner to be described.

For the purpose of causing the sleeve or split ring to exert clamping pressure about the lens barrel to thereby firmly grip the barrel and hold the coupling device in position thereon, or in other words, to be constricted around the barrel, a pressure exerting element, such as a set screw 30, which is threaded through the holding member 14, is urged into a recess 31 provided in the sleeve or split ring 15 for its accommodation. Set screw 30 is provided with a knurled head 32 by means of which it may be turned, when it is desired either to secure the coupling device in position on or to remove it from the lens barrel.

It will be noted that when the device is separated from the camera, and the set screw 30 is thus loosened for that purpose, the slot 29 will be opened to its maximum position, as indicated by the dotted line 34. When the device is fitted in position on the lens barrel, as indicated in Fig. 1 and the set screw is manually turned inwardly, its pressure upon the sleeve 15 will tend to close the slot 29 to an extent required which ensures the sleeve to be firmly contracted or constricted about the lens barrel 11 and to securely hold its position thereabout. To ascertain and to arrive at this constriction about the lens barrel, it is desirable that the set screw be located relatively close to the slot 29. It may also be found desirable to restrain that portion of the sleeve 15 at the opposite side of the slot 29 from moving or sliding away from the portion of the sleeve that is sprung towards it by pressure of the set screw 30. For this purpose, it might be considered useful to maintain that portion in position by any suitable fixing means, such as projection and notch engagement, although this will possibly be necessary in cases of lense barrels having relatively large diameter. From the arrangement described, it will be clear that the device can be fitted in place and securely clamped about the lens barrel by tightening or pressure exertion by means of the set screw 30.

In Fig. 2 is shown a modified construction of the coupling device wherein the sleeve 13 is provided with interengaging formations, namely, externally located screw threads 40 which loosely engage screw threads 41 provided on the interior of the inner portion 18 of the holding member 14. The set screw 30, in this embodiment, functions as described with respect to the embodiment of Fig. 1 and serves also to hold the member 14 against unthreading movement with respect to the sleeve or split ring 15.

In the embodiment of Fig. 3, the inner portion 18 of the holding member 15 is bevelled or inclined as shown at 42, and the peripheral face of the sleeve or split ring 15 is complementarily inclined or tapered, as shown at 43. With this arrangement, the ring 15, which once sprung in place within the member 14, will retain its position therein, yet will be free to be contracted by pressure of the set screw 30 as described in respect to the embodiment of the invention shown in Fig. 1.

In the several embodiments of the invention shown and described, it will be clear that the placement of the device in position upon a lens barrel is considerably simplified and effective. Sleeve or split ring 15 is merely slipped in position about the lens barrel and the set screw 30 operated to the extent required to constrict the ring 15 tightly about the lens barrel so as to cause it to frictionally grip the same and hold its position thereon. When the set screw is loosened, the springiness of the ring 15 causes it to spread or open to the extent required to enable it to be slipped from the barrel. The position of the set screw 30, extending radially from the device and exposed for easy manipulation enables the device to be easily and conveniently fitted in place or removed, and the removal of the lens shade or filters interposed between the same and the forward part of the holding member 14 can be done at any time without requiring removal of the holding member 14. These and other advantages will be readily apparent to those skilled in this art.

It is well understood that the split ring 15 may be made from any suitable springy material or may be made from a plastic composition, such as known in the trade under the name of Bakelite, and that a plurality or set of such interchangeable split rings may be employed in connection with the holding member 14, it being understood that the inner diameter of the split ring 15 may vary in accordance with the dimensions and make of the lens barrel.

While several embodiments of the invention are hereinabove described, it will be apparent that the same is not to be restricted thereto, but is broad enough to cover other structures coming within the scope of the annexed claims.

Having thus described the invention, what is claimed as new and desired to be secured by Letters Patent, is:

1. In a device of the character described, a tubular holding member having an inner surface, means for detachably fixing a camera lens attachment to said holding member, said holding member having an inclined portion on said inner surface, a split ring having an outer inclined peripheral surface complementary to and coacting with said inclined portion of said tubular holding member, a shoulder extending from said inner surface of said tubular holding member against which said split ring laterally abuts, and an element threaded through said tubular holding member and engageable with said split ring to bear against and contract the latter about a lens barrel.

2. In a device of the character described, a tubular holding member having a portion adapted to detachably receive a lens attachment, said tubular member having a rearward part provided with an inner surface having threads, a split ring having its outer face threaded for reception by the threads of said tubular member, and a set screw threaded through the tubular member and engageable against the threaded outer face of said split ring to cause contraction of said ring around a lens barrel over which said split ring is placed.

3. In a device of the character described, an outer tubular member for carrying a light regulating attachment, a split ring placed for position in said tubular member and terminating in a V-shaped slot, interengaging formations, respectively, arranged on the outer surface of said split ring and on the inner surface of said tubular member for holding said split ring in position and to impede separation from each other in axial direction, an annular rim within said tubular member against which said split ring laterally abuts, and a set screw threadedly extending through said outer tubular member and operatively engageable with a portion of said split ring whereby said screw is enabled to narrow the V-shaped slot of said ring when said set screw is threaded against said ring and to constrict said ring about a lens barrel to which said ring may be applied.

4. In a device of the character described; a holding member for carrying a lens attachment, means for coupling said holding member to a lens barrel of a camera, said means including a ring split across its periphery so as to provide spaced apart cut ends, a projecting portion provided on the outer surface of said split ring, a recess provided in the inner surface of said holding member and conformed to the shape of and coacting with said projecting portion, said holding member being provided with an inner annular rim adapted for lateral abutment of said projecting portion against said rim, whereby said split ring may be held in position within said holding member to prevent separation from each other in axial direction, and adjusting means carried by and passing through said holding member and operable against said split ring to contract the ends thereof, to thereby bring about tight frictional surface engagement of said split ring with said lens barrel to which said holding member is to be applied.

HENRYK NAGEL.

REFERENCES CITED

The following references are of record in the file of this patent:

UNITED STATES PATENTS

| Number | Name | Date |
|---|---|---|
| 1,228,389 | Barnes | June 5, 1917 |
| 1,286,287 | Glenn | Dec. 3, 1918 |
| 1,780,384 | Green | Nov. 4, 1930 |
| 2,241,596 | Guhl | May 13, 1941 |

FOREIGN PATENTS

| Number | Country | Date |
|---|---|---|
| 385,905 | Germany | Dec. 12, 1923 |
| 309,938 | Great Britain | Apr. 18, 1929 |